(12) United States Patent
Mori et al.

(10) Patent No.: US 11,027,373 B2
(45) Date of Patent: Jun. 8, 2021

(54) ALUMINUM ALLOY CLAD MATERIAL

(71) Applicants: Mitsubishi Aluminum Co., Ltd., Minato-ku (JP); DENSO CORPORATION, Kariya (JP)

(72) Inventors: Yoshiki Mori, Kitamoto (JP); Hideyuki Miyake, Susono (JP); Michihide Yoshino, Susono (JP); Shohei Iwao, Susono (JP); Masakazu Edo, Susono (JP); Naoki Sugimoto, Anjo (JP); Nobuhiro Honma, Chita-gun (JP); Shogo Yamada, Nagoya (JP); Hayaki Teramoto, Okazaki (JP); Taketoshi Toyama, Anjo (JP)

(73) Assignees: Mitsubishi Aluminum Co., Ltd., Minato-ku (JP); DENSO CORPORATION, Kariya (JP)

( * ) Notice: Subject to any disclaimer, the term of this patent is extended or adjusted under 35 U.S.C. 154(b) by 0 days.

(21) Appl. No.: 16/916,441

(22) Filed: Jun. 30, 2020

(65) Prior Publication Data
US 2021/0001434 A1    Jan. 7, 2021

(30) Foreign Application Priority Data

Jul. 3, 2019  (JP) .............................. JP2019-124414
Apr. 27, 2020  (JP) .............................. JP2020-078180

(51) Int. Cl.
*B23K 35/28* (2006.01)
*C22C 21/02* (2006.01)
(Continued)

(52) U.S. Cl.
CPC ........ *B23K 35/286* (2013.01); *B23K 35/0238* (2013.01); *B32B 15/016* (2013.01);
(Continued)

(58) Field of Classification Search
None
See application file for complete search history.

(56) References Cited

U.S. PATENT DOCUMENTS

2018/0169798 A1* 6/2018 Izumi ................... B23K 35/288

FOREIGN PATENT DOCUMENTS

JP         4547032 B1     9/2010
JP         2014-050861 A  3/2014

* cited by examiner

*Primary Examiner* — Daniel J. Schleis
(74) *Attorney, Agent, or Firm* — Obion, McClelland, Maier & Neustadt, L.L.P.

(57) ABSTRACT

An aluminum alloy clad material includes: a sacrificial material on one surface of a core material; and an Al—Si—Mg—Bi-based brazing material disposed on other surface of the core material, contains, by mass %, Si: 6.0% to 14.0%, Mg: 0.05% to 1.5%, Bi: 0.05% to 0.25%, Sr: 0.0001% to 0.1%, and a balance consisting of Al and inevitable impurities, and satisfies a relationship of (Bi+Mg)×Sr≤0.1 by mass %, in which Mg—Bi-based compounds contained in the Al—Si—Mg—Bi-based brazing material with a diameter of 0.1 μm or more and less than 5.0 μm are more than 20 in number per 10,000-μm² and the Mg—Bi-based compounds with a diameter of 5.0 μm or more are less than 2 in number, and the core material contains Mn: 0.9% to 1.7%, Si: 0.2% to 1.0%, Fe: 0.1% to 0.5%, Cu: 0.08% to 1.0%, and a balance consisting of Al and inevitable impurities.

18 Claims, 2 Drawing Sheets

(51) Int. Cl.
 _B32B 15/01_ (2006.01)
 _B23K 35/02_ (2006.01)
 _B23K 101/14_ (2006.01)
(52) U.S. Cl.
 CPC .......... _C22C 21/02_ (2013.01); _B23K 2101/14_ (2018.08); _Y10T 428/12764_ (2015.01)

LOCATIONS FOR EVALUATING WIDTH OF JOINT PART

ALUMINUM ALLOY CLAD MATERIAL

BACKGROUND OF THE INVENTION

Field of the Invention

This invention relates to an aluminum alloy clad material for flux-free brazing which is joined without a flux.

Priority is claimed on Japanese Patent Application No. 2019-124414 filed on Jul. 3, 2019 and Japanese Patent Application No. 2020-078180 filed on Apr. 27, 2020, the contents of which are incorporated herein by reference.

Description of Related Art

As the size and weight of aluminum heat exchangers for vehicles such as condensers and evaporators have been reduced, thinning and high-strengthening of aluminum materials have proceeded. In the manufacturing of aluminum heat exchangers, brazing is performed to join joints. However, in a brazing method using the current mainstream fluoride-based flux, the flux reacts with Mg in a material to be deactivated and is likely to cause brazing defects, so that the use of a Mg-added high strength member is limited. Therefore, a brazing method of joining a Mg-added aluminum alloy without using a flux is desired.

In flux-free brazing using an Al—Si—Mg brazing material, Mg in the brazing material that has been melted and activated reduces and decomposes an Al oxide film ($Al_2O_3$) on the surface of a joint, whereby joining is achieved. In a closed surface joint or the like, a good joined state is obtained at a joint where brazing sheets having brazing materials are combined by a decomposition action of an oxide film by Mg, and a joint where a brazing sheet and a member (bare material) to be joined which does not have a brazing material are combined (refer to Japanese Patent (Granted) Publication No. 4547032).

However, a tube-fin joint, which is a representative joint shape of a general heat exchanger such as a condenser and an evaporator, is easily affected by an atmosphere, and a MgO film tends to grow on the surface of a Mg-added brazing material. Since the MgO film is a stable oxide film that is less likely to be decomposed, joining is significantly impeded.

Therefore, in order to apply a flux-free technique to a general heat exchanger, a brazing sheet for flux-free brazing capable of obtaining a stable joined state at a joint having an open portion is strongly desired.

In the related art, as a method for stabilizing a joined state of flux-free brazing, for example, a technique in which an Al—Si—Mg—Bi-based brazing material described in Japanese Unexamined Patent Application, First Publication No. 2014-50861 is used to control a distributed state of Bi particles and Mg—Bi compound particles in the brazing material is proposed. According to this technique, it is considered that by dispersing simple Bi or a Bi—Mg compound having an equivalent circle diameter of 5.0 to 50 m in the brazing material, these compounds are exposed to the surface of the brazing material during the manufacturing of a material, and the formation of ah oxide film at the exposed portion is thus suppressed, so that flux-free brazability within a short braze heating time is improved.

SUMMARY OF THE INVENTION

However, in the flux-free brazing method proposed in the related art, it is difficult to say that joinability that is stable enough to replace the brazing method using the current mainstream fluoride-based flux is obtained, and a further technical improvement is necessary for wide application to general heat exchangers.

The present invention has been made based on the above circumstances, and an object thereof is to provide an aluminum alloy clad material for flux-free brazing with which brazing can be stably performed without a flux.

Therefore, the present inventors conducted intensive examinations in view of the above problems, and as a result, found that it is most important to uniformly concentrate Bi on the surface during braze melting in order to further improve brazability in a Bi-added Al—Si—Mg-based brazing material. In addition, although a coarse Mg—Bi compound of 5 μm or more is effective in suppressing the generation of an oxide film during manufacturing of a material, it is difficult to dissolve the Mg—Bi compound during braze heating, but by dispersing a rather fine Bi—Mg compound of 0.1 μm or more and less than 5.0 μm to a predetermined number density or more, the Mg—Bi compound is reliably dissolved during the braze heating to generate metal Bi. As the generated Bi is uniformly concentrated on the surface, good brazability is obtained.

Furthermore, the relationship between a braze melting behavior in flux-free brazing and brazability was investigated, and it was important to generate an active molten braze within a short period of time and form a fillet while suppressing oxidation in the flux-free brazing. Therefore, since a brazing material having a low liquidus temperature and a short solid-liquid coexistence region was preferable, it became clear that a high Si brazing material is suitable and repeated examinations were conducted on a method to suppress coarse primary phase Si generated during casting, which is a problem with the high Si brazing material.

Furthermore, repeated examinations were further conducted on the components of a core material, and by optimizing the components and combination of each layer and combining the core material with an Al—Si—Mg—Bi brazing material in which the dispersed state of a Mg—Bi compound is appropriately controlled as described above, a brazing sheet for flux-free brazing with which a stable joined state is obtained at a joint having an opening portion and excellent corrosion resistance and strength are achieved after brazing was invented.

That is, among aluminum alloy clad materials according to the present invention, a first aspect is an aluminum alloy clad material having three layers including: a sacrificial material disposed on one surface of a core material; and an Al—Si—Mg—Bi-based brazing material which is disposed on the other surface of the core material, contains, by mass %, Si: 6.0% to 14.0%, Mg: 0.05% to 1.5%, Bi: 0.05% to 0.25%, Sr: 0.0001% to 0.1%, and a balance consisting of Al and inevitable impurities, and satisfies a relationship of (Bi+Mg)×Sr≤0.1 in amounts of elements by mass %, in which Mg—Bi-based compounds contained in the Al—Si—Mg—Bi-based brazing material and having a diameter of 0.1 m or more and less than 5.0 μm in terms of equivalent circle diameter when observed in a surface layer plane direction before brazing are more than 20 in number per 10,000-μm² visual field and the Mg—Bi-based compounds having a diameter of 5.0 μm or more are less than 2 in number per 10,000-μm² visual field.

Furthermore, the core material contains, by mass %, Mn: 0.9% to 1.7%, Si: 0.2% to 1.0%, Fe: 0.1% to 0.5%, Cu: 0.08% to 1.0%, Mg: 0.1% to 0.7% and a balance consisting of Al and inevitable impurities.

In an invention of an aluminum alloy clad material of a second aspect, in the invention of the above aspect, the core material further contains Mg: 0.1% to 0.7% and contains a balance consisting of Al and inevitable impurities.

In an invention of an aluminum alloy clad material of a third aspect, in the invention of the above aspect, the core material further contains Ti: 0.05% to 0.3% and contains a balance consisting of Al and inevitable impurities.

In an invention of an aluminum alloy clad material of a fourth aspect, in the invention of the above aspect, a concentration of Mg on a surface of the brazing material at a braze melting temperature is in a range of 0.15% to 1.0%.

In an invention of an aluminum alloy clad material of a fifth aspect, in the invention of the above aspect, the sacrificial material contains, by mass %, one or two or more of Zn: 0.2% to 6.0%, Mn: 0.3% to 1.3%, Si: 0.2% to 0.8%, Mg: 0.02% to 0.3%, Fe: 0.2% to 0.8%, Cr: 0.05% to 0.5%, and Ti: 0.05% to 0.3%, and contains a balance consisting of Al and inevitable impurities, and a concentration of Cu on a surface of the sacrificial material after brazing is 0.12% or less.

Hereinafter, the content specified by the present invention will be described together with the actions thereof.

All the components described below are shown in mass %.

<Brazing Material>

Si: 6.0% to 14.0%

Si is added to form a molten braze during brazing and form a fillet at a joint. In flux-free brazing at an open portion, it is important to generate an active molten braze within a short period of time and form a fillet while suppressing oxidation. Therefore, a brazing material having a low liquidus temperature and a short solid-liquid coexistence region is preferable. When the Si content is less than the lower limit, the time for generating the molten braze increases, and the molten braze is insufficient. On the other hand, when the Si content exceeds the upper limit, the time for generating the molten braze also increases and a material becomes hard and brittle, making it difficult to manufacture the material. Therefore, the S content is set to be in the above range.

For the same reason, it is desirable that the Si content is set to 9.0% at the lower limit and 13.0% at the upper limit.

Mg: 0.05% to 1.5%

Mg is added to reduce and decompose an Al oxide film ($Al_2O_3$). When the Mg content is less than the lower limit, the effect is insufficient. When the Mg content exceeds the upper limit, Mg reacts with oxygen in a brazing atmosphere and generates MgO that impedes joining, and the material becomes hard and brittle, making it difficult to manufacture the material. Therefore, the Mg content is set to be in the above range.

For the same reason, the Mg content is desirably set to 0.1% at the lower limit and 1.2% at the upper limit, and more desirably set to 0.2% at the lower limit and 1.0% at the upper limit.

Bi: 0.05% to 0.25%

Bi is added to suppress oxidation during brazing by concentrating on the surface of the material in a brazing temperature rising process, and to improve the joinability at the open portion by reducing the surface tension of the molten braze. When the Bi content is less than the lower limit, the effect is insufficient. When the Bi content exceeds the upper limit, not only be the effect saturated, but also Bi oxides are easily generated on the material surface, thereby impeding joining. Therefore, the Bi content is set to be in the above range.

For the same reason, it is desirable that the Bi content is set to 0.08% at the lower limit and 0.23% at the upper limit.

Sr: 0.0001% to 0.1%

Sr is added to suppress the generation of coarse primary phase Si generated in a brazing material having a high Si content. When the Sr content is less than the lower limit, the effect is insufficient. When the Sr content exceeds the upper limit, Sr is oxidized on the surface of a molten metal during casting and the amount of dross increases, or coarse compounds are formed and castability decreases. Therefore, the Sr content is set to be in the above range.

For the same reason, it is desirable that the Sr content is set to 0.0005% at the lower limit and 0.06% at the upper limit.

$(Bi+Mg) \times Sr \leq 0.1$

An Al—Si—Mg—Bi-based brazing material for flux-free brazing contains active Mg and Bi. Therefore, when the Al—Si—Mg—Bi-based brazing material coexists with a certain amount or more of Sr, a coarse Bi—Mg—Sr compound is generated in the molten metal during casting, so that castability decreases. This compound becomes easier to generate as the total amount of Bi and Mg increases and as the Sr content increases.

$(Bi+Mg) \times Sr$ indicates the critical condition for the generation of this coarse Bi—Mg—Sr compound. By setting $(Bi+Mg) \times Sr \leq 0.1$, a coarse Bi—Mg—Sr compound is not generated even when Sr is added to the Al—Si—Mg—Bi-based brazing material, and the effect of suppressing the generation of primary phase Si, which is the original purpose of the addition of Sr, can be obtained. Therefore, $(Bi+Mg) \times Sr$ is set to be in the above range.

For the same reason, it is desirable that $(Bi+Mg) \times Sr \leq 0.08$ is satisfied.

As an inevitable impurity of the brazing material, Fe: 0.3% or less may be contained.

Mg—Bi-based Compounds: Those Having Diameter of 0.1 to Less Than 5.0 m in Terms of Equivalent Circle Diameter Are More Than 20 in Number per 10,000-$\mu m^2$ Visual Field Dispersion of fine Mg—Bi-based compounds facilitates uniform concentration of Bi on the material surface when the compound melts in the brazing temperature rising process, and thus suppresses the oxidation of the material. Even if compounds of less than 0.1 μm are dissolved, the above effect cannot be obtained because the dissolved amount is insufficient Compounds of 5.0 μm or more are difficult to melt in the brazing temperature rising process and remain as compounds, so that the above effect cannot be obtained. Furthermore, when the compounds are 20 or less in number per 10,000-$\mu m^2$ visual field, the number of dissolved portions is insufficient, and Bi is difficult to uniformly concentrate on the material surface. For the same reason, the number thereof is desirably 30 or more, and more preferably 40 or more.

For example, the number of particles of the Mg—Bi-based compounds on the surface of the brazing material is obtained by subjecting the surface of the brazing material of the produced material to a mirror finish with 0.1-μm abrasive grains, performing fully automatic particle analysis using a field emission type electron beam microanalyzer (FE-EPMA), producing a thin film from the surface of a brazing material layer, which is cut, by performing mechanical polishing and electrolytic polishing in order to measure fine compounds of 1 μm or less, observing the thin film with a transmission electron microscope (TEM), and counting the number of particles of the Mg—Bi-based compounds of 0.1 to 5.0 µm in an observation visual field of 10,000 µm² (100-µm square) in a surface direction.

As means for finely and densely distributing the Mg—Bi-based compounds, adjustment can be achieved by appropriately combining, during casting, performing the casing at a high cooling rate from a high molten metal temperature (coarse crystallization of the Mg—Bi compounds is suppressed, solid solution of Mg and Bi during the casting is promoted, and Mg and Bi are dispersed in a desired state by subsequent heat treatments), during hot rolling, taking a large total reduction rate of a certain level or more (refinement and an increase in number density are achieved by promoting crushing of crystallized products), taking a long rolling time in a high temperature range (dynamic precipitation during hot rolling is promoted), reducing a hot rolling finish temperature and increasing the subsequent cooling rate (coarse precipitation due to slow cooling is suppressed), and the like.

Mg—Bi-based Compounds: Those Having Diameter of 5.0 µm or More in Terms of Equivalent Circle Diameter Are Less Than 2 in Number per 10,000-µm² Visual Field Coarse Mg—Bi-based compounds are difficult to melt during the brazing temperature rising process, Bi is difficult to concentrate uniformly on the material surface, and the generation of coarse compounds reduces the generation of fine Mg—Bi compounds of less than 5.0 µm. Therefore, the number thereof needs to be lower than a predetermined value.

The number of particles of the Mg—Bi-based compounds on the surface of the brazing material is obtained by the fully automatic particle analysis by FE-EPMA described above. As means for suppressing the generation of coarse Mg—Bi-based compounds, adjustment can be achieved by appropriately controlling the above-mentioned casting conditions and hot rolling conditions.

For example, adjustment can be achieved by appropriately combining, during casting, performing the casing at a high cooling rate from a high molten metal temperature (coarse crystallization of the Mg—Bi compounds is suppressed), during hot rolling, taking a large total reduction rate of a certain level or more (refinement is achieved by promoting crushing of crystallized products), reducing a hot rolling finish temperature and increasing the subsequent cooling rate (coarse precipitation due to slow cooling is suppressed), and the like.

<Core Material>

Mn: 0.9% to 1.7%

Mn is added to improve the strength of the material by precipitating as an intermetallic compound such as Al—Mn, Al—Mn—Si, Al—Mn—Fe, and Al—Mn—Si—Fe. When the Mn content is less than the lower limit, the effect is insufficient. When the Mn content exceeds the upper limit, a huge intermetallic compound (crystallized product) is formed during the casting and the rollability decreases.

For the same reason, it is desirable that the lower limit thereof is set to 1.1% and the upper limit thereof is set to 1.6%. It is more desirable that the lower limit thereof is set to 1.2%.

Si: 0.2% to 1.0%

Si is added to improve the material strength by being dissolved as a solid solution and also improve the material strength by precipitating as $Mg_2Si$ or Al—Mn—Si and Al—Mn—Si—Fe intermetallic compounds. When the Si content is less than the lower limit, the effect is insufficient. When the Si content exceeds the upper limit, the melting point of the material decreases and erosion occurs during brazing.

For the same reason, it is desirable that the lower limit thereof is set to 0.6% and the upper limit thereof is set to 0.9%.

Fe: 0.1% to 0.5%

Fe is added to improve the material strength by precipitating as an intermetallic compound such as Al—Mn—Fe and Al—Mn—Si—Fe. When the Fe content is less than the lower limit, the effect is insufficient. When the Fe content exceeds the upper limit, a huge intermetallic compound (crystallized product) is formed during the casting and the rollability decreases.

For the same reason, it is desirable that the lower limit thereof is set to 0.12% and the upper limit thereof is set to 0.4%.

Cu: 0.08% to 1.0%

Cu is added to improve the material strength by being dissolved as a solid solution. When the Cu content is less than the lower limit, the effect is insufficient. When the Cu content exceeds the upper limit, the corrosion resistance decreases.

For the same reason, it is desirable that the lower limit thereof is set to 0.15% and the upper limit thereof is set to 0.85%.

Mg: 0.1% to 0.7%

Mg improves the material strength by precipitating as compounds with Si and the like, and improves joinability by diffusing on the surface of the brazing material and reducing and decomposing the oxide film ($Al_2O_3$), so that Mg is added as desired. When the Mg content is less than the lower limit, the effect is insufficient. When the Mg content exceeds the upper limit, the material becomes too hard, making it difficult to manufacture the material.

For the same reason, it is desirable that the lower limit thereof is set to 0.2% and the upper limit thereof is set to 0.65%.

Mg may be contained as an inevitable impurity, for example, in 0.05% or less.

Ti: 0.05% to 0.3%

Ti improves the pitting corrosion resistance of a clad material by precipitating as an Al—Ti-based intermetallic compound and dispersing starting points of corrosion, or by forming dark and light portions of solid solution Ti and making the form of corrosion into a layered form, so that Ti is added as desired. When the Ti content is less than the lower limit, the effect is insufficient. When the Ti content exceeds the upper limit, a huge intermetallic compound is formed during the casting and the rollability decreases.

For the same reason, it is desirable that the lower limit thereof is set to 0.07% and the upper limit thereof is set to 0.25%.

Ti may be contained as an inevitable impurity, for example, in less than 0.05%.

Mg Concentration on Surface of Brazing Material at Braze Melting Temperature is 0.15% to 1.0%

As a result of repeated research on the reductive decomposition action of the Al oxide film by an Al—Si—Mg brazing material, it has become clear that the concentration of Mg present on the surface of a joint during braze melting is much more important than the amount of Mg added to the brazing material.

In flux-free brazing, by using the Al—Si—Mg brazing material, Mg in the brazing material that has been melted and activated reduces and decomposes an Al oxide film ($Al_2O_3$) on the surface of a joint, whereby joining is achieved. On the other hand, when Mg reacts with oxygen in the environment, a strong MgO film is generated, and the brazability is reduced. Therefore, in order to achieve stable joining in flux-free brazing, it is important to suppress oxidation by causing Mg not to be present on the material surface (that is, the surface of the brazing material) more than necessary until the braze melting temperature is reached, and to reduce and decompose the Al oxide film by causing Mg to be present on the material surface (that is, the surface of the brazing material) at the braze melting temperature in a predetermined amount or more.

In the clad material, Mg diffuses into each layer. Specifically, even if Mg is added only to the brazing material, Mg diffuses in a direction toward the core material, and in a case where the amount of Mg remaining on the surface of the brazing material during braze melting is a predetermined value or lower, the flux joinability decreases. That is, in the clad material, in addition to the initial amount of Mg added, the amount of Mg on the surface of the brazing material at the braze melting temperature is important. By causing the amount of Mg to be in a predetermined range, the reduction and decomposition of the Al oxide film can be achieved while suppressing oxidation.

In a case where the Mg concentration at the braze melting temperature is less than 0.15%, the amount of Mg necessary for the decomposition and reduction is insufficient, and the brazability is reduced. On the other hand, in a case where the Mg concentration exceeds 1.0%, a strong MgO film is generated by oxidation, and the brazability is also reduced. Therefore, it is desirable that the Mg concentration on the surface of the brazing material at the braze melting temperature is set to 0.15% to 1.0%.

For the same reason, it is desirable that the lower limit thereof is set to 0.2% and the upper limit thereof is set to 0.85%.

Although the braze melting temperature varies depending on the components of a material, in the present invention, a temperature subtracted by 10° C. from a solidus temperature is treated as the braze melting temperature.

In the present invention, a sacrificial material is disposed on one surface of the core material, and the components thereof are not specified in the first aspect of the invention. Hereinafter, components suitable as the sacrificial material will be described.

With suitable components, the components and combination of each layer are further optimized, a stable joined state is obtained at a joint having an open portion, and the corrosion resistance and strength after brazing are excellent.

Sacrificial Material

Zn: 0.2% to 6.0%

Zn is added as desired to exhibit a sacrificial anticorrosive effect by making the natural potential of the material lower than that of other members and improve the pitting corrosion resistance of the clad material. When the Zn content is less than the lower limit, the effect is insufficient. When the Zn content exceeds the upper limit, the potential becomes too low, the corrosion consumption rate of the sacrificial material increases, and the pitting corrosion resistance of the clad material is reduced by the loss of the sacrificial material at an early stage.

For the same reason, the Zn content is desirably set to 0.4% at the lower limit and 5.7% at the upper limit, and more preferably set to 0.6% at the lower limit.

In a case where Zn is not contained, Zn may be contained as an inevitable impurity in 0.1% or less.

Mn: 0.3% to 1.3%

Mn is added as desired to improve the pitting corrosion resistance of the clad material by precipitating as an intermetallic compound such as Al—Mn, Al—Mn—Si, Al—Mn—Fe, and Al—Mn—Si—Fe and dispersing starting points of corrosion. When the Mn content is less than the lower limit, the effect is insufficient. When the Mn content exceeds the upper limit, the corrosion ratio increases, and the pitting corrosion resistance of the clad material is reduced by the loss of the sacrificial material at an early stage.

For the same reason, it is desirable that the lower limit thereof is set to 0.4% and the upper limit thereof is set to 1.2%.

In a case where Mn is not contained, Mn may be contained as an inevitable impurity in 0.05% or less.

Si: 0.2% to 0.8%

Si is added as desired to improve the pitting corrosion resistance of the clad material by precipitating as simple Si or an intermetallic compound such as Al—Fe—Si, Al—Mn—Si, and Al—Mn—Si—Fe and dispersing starting points of corrosion. When the Si content is less than the lower limit, the effect is insufficient. When the Si content exceeds the upper limit, the corrosion ratio increases, and the pitting corrosion resistance of the clad material is reduced by the loss of the sacrificial material at an early stage.

For the same reason, it is desirable that the lower limit thereof is set to 0.3% and the upper limit thereof is set to 0.7%.

In a case where Si is not contained, Si may be contained as an inevitable impurity in 0.05% or less.

Mg: 0.02% to 0.3%

Mg is added as desired to improve the corrosion resistance by strengthening the oxide film. When the Mg content is less than the lower limit, the effect is insufficient. When the Mg content exceeds the upper limit, the material becomes too hard and rolling manufacturability is lowered.

For the same reason, it is desirable that the lower limit thereof is set to 0.05% and the upper limit thereof is set to 0.25%.

In a case where Mg is not contained, Mg may be contained as an inevitable impurity in 0.01% or less.

Fe: 0.2% to 0.8%

Fe is added as desired to improve the pitting corrosion resistance of the clad material by precipitating as an intermetallic compound such as Al—Fe, Al—Fe—Si, Al—Mn—Fe, and Al—Mn—Si—Fe and dispersing starting points of corrosion. When the Fe content is less than the lower limit, the effect is insufficient. When the Fe content exceeds the upper limit, the corrosion ratio increases, and the pitting corrosion resistance of the clad material is reduced by the loss of the sacrificial material at an early stage.

For the same reason, it is desirable that the lower limit thereof is set to 0.3% and the upper limit thereof is set to 0.7%.

In a case where Fe is not contained, Fe may be contained as an inevitable impurity in 0.05% or less.

Cr: 0.05% to 0.5%

Cr is added as desired to improve the pitting corrosion resistance of the clad material by precipitating as an Al—Cr-based intermetallic compound and dispersing starting points of corrosion, or by forming dark and light portions of solid solution Cr and making the form of corrosion into a layered form. When the Cr content is less than the lower limit, the effect is insufficient. When the Cr content exceeds the upper limit, a huge intermetallic compound is formed during the casting and the rollability decreases.

For the same reason, it is desirable that the lower limit thereof is set to 0.1% and the upper limit thereof is set to 0.4%.

In a case where Cr is not contained, Cr may be contained as an inevitable impurity in less than 0.05%.

Ti: 0.05% to 0.3%

Ti added as desired to improve the pitting corrosion resistance of the clad material by precipitating as an Al—Ti-based intermetallic compound and dispersing starting points of corrosion, or by forming dark and light portions of solid solution Ti and making the form of corrosion into a layered form, so that Ti is added as desired. When the Ti content is less than the lower limit, the effect is insufficient. When the Ti content exceeds the upper limit, a huge intermetallic compound is formed during the casting and the rollability decreases.

For the same reason, it is desirable that the lower limit thereof is set to 0.07% and the upper limit thereof is set to 0.25%.

In a case where Ti is not contained, Ti may be contained as an inevitable impurity in less than 0.05%.

Cu Concentration on Surface of Sacrificial Material after Brazing is 0.12% or Less When Cu diffused from the brazing material or the like is present on the surface of the sacrificial material, pitting corrosion is likely to occur, and Cu eluted due to corrosion is precipitated on the material surface as metal Cu, resulting in an increase in corrosion ratio. Therefore, by setting the Cu concentration on the surface of the sacrificial material after brazing to a predetermined value or less, the corrosion resistance of the clad material can be improved.

For the same reason, it is desirable that the Cu concentration is set to 0.10% or less.

That is, according to the present invention, stable brazing is possible in the flux-free brazing, and after brazing, an effect of exhibiting high strength and excellent corrosion resistance can be obtained.

DETAILED DESCRIPTION OF THE INVENTION

Figure 1:
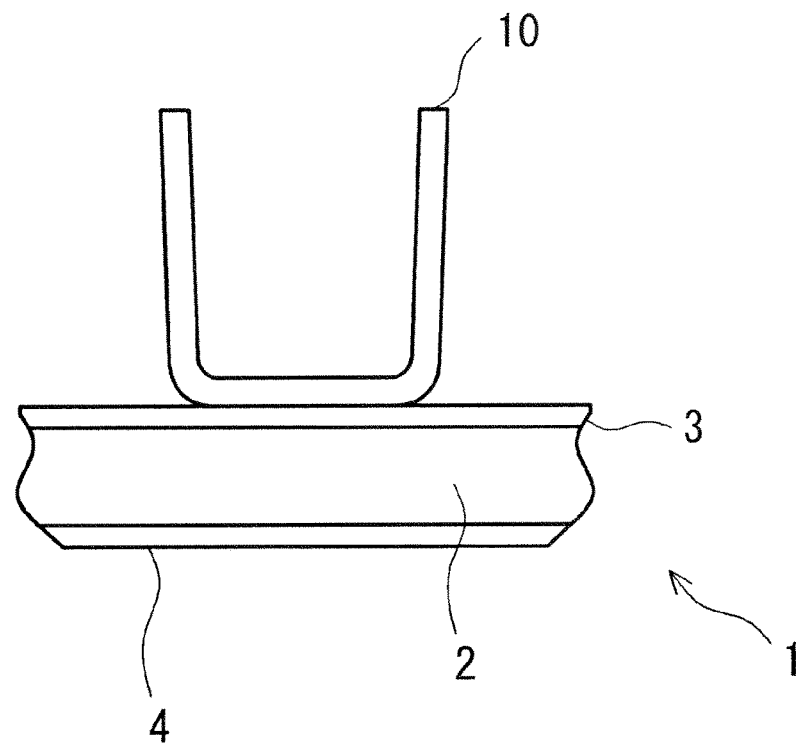
FIG. 1 is a view illustrating a brazing sheet for flux-free brazing according to an embodiment of the present invention.

Hereinafter, an embodiment of the present invention will be described.

An aluminum alloy clad material of the present embodiment in which a sacrificial material is disposed on one surface of a core material and a brazing material is disposed on the other surface can be manufactured, for example, by the following method.

As an aluminum alloy for the core material, an aluminum alloy is adjusted to have a composition including, by mass %, Mn: 0.9% to 1.7%, Si: 0.2% to 1.0%, Fe: 0.1% to 0.5%, Cu: 0.08% to 1.0%, and Mg: 0.1% to 0.7%, further including one or two or more of Mg: 0.1% to 0.7% and Ti: 0.05% to 0.3%, and including a balance consisting of Al and inevitable impurities.

As an aluminum alloy for the brazing material, an Al—Si-based brazing material having a composition including, by mass %, Si: 6.0% to 14.0%, Mg: 0.05% to 1.5%, Bi: 0.1% to 0.25%, Sr: 0.0001% to 0.1%, and a balance consisting of Al and inevitable impurities is used.

In the present embodiment, in order to disperse a fine Mg—Bi compound at the time before brazing, Mg and Bi are dissolved in an ingot as a solid solution by performing casing at a high cooling rate from a high molten metal temperature during casting of the brazing material while suppressing coarse crystallization of the Mg—Bi compound.

Specifically, the solid solubility of Mg and Bi can be increased by setting the molten metal temperature to 700° C. or higher.

The obtained aluminum alloy ingot is subjected to a homogenization treatment under predetermined conditions. When the homogenization treatment temperature is low, a coarse Mg—Bi compound is precipitated and it is difficult to obtain the distributed state of the Mg—Bi compound of the present invention at the time before the brazing. Therefore, it is desirable to perform the treatment at a treatment temperature of 400° C. or higher for 1 to 10 hours.

As an aluminum alloy for the sacrificial material, an aluminum alloy is adjusted to have a composition including, by mass %, one or two or more of Zn: 0.2% to 6.0%, Mn: 0.3% to 1.3%, Si: 0.2% to 0.8%, Mg: 0.02% to 0.3%, Fe: 0.2% to 0.8%, Cr: 0.05% to 0.5%, Ti: 0.05% to 0.3%, and including a balance consisting of Al and inevitable impurities. In the present invention, the composition of the sacrificial material is not limited thereto.

Next, the brazing material is assembled with the core material and the sacrificial material and is subjected to hot clad rolling. At this time, in the present embodiment, the Mg—Bi compound is adjusted to a predetermined size and number density by controlling a rolling time at a predetermined temperature during hot rolling, an equivalent strain from the start to the end of the hot rolling, a hot rolling finish temperature, and a cooling rate after the hot rolling.

First, by satisfying the rolling time in a predetermined temperature range during the hot rolling, precipitation of the Mg—Bi compound having a predetermined size defined in the present invention is promoted in an environment where dynamic strain is applied. Specifically, the precipitation of the fine Mg—Bi compound is promoted by setting the rolling time during which the material temperature during the hot rolling is between 400° C. and 500° C. to 10 minutes or more.

Furthermore, by controlling the equivalent strain from the start to the end of the hot rolling, a coarse Mg—Bi crystallized product generated during the casting can be crushed and refined, and the number density thereof can be increased. Specifically, the Mg—Bi crystallized product is sufficiently refined by adjusting a slab thickness and a finish thickness so that the equivalent strain s represented by Formula (1) satisfies $\varepsilon > 5.0$, thereby increasing the number density $$\varepsilon = (2/\sqrt{3})\ln(t_0/t) \qquad \text{Formula (1)}$$

$t_0$: Hot rolling start thickness (slab thickness)

$t$: Hot rolling finish thickness

Furthermore, when the hot rolling finish temperature is high and a state without dynamic strain is maintained, or when the cooling rate after the hot rolling is slow, a coarser Mg—Bi compound than desired by the present invention is precipitated at grain boundaries and the like. Therefore, by securing a cooling rate of a certain level or more by reducing the hot rolling finish temperature to a predetermined temperature, the precipitation of a coarse Mg—Bi compound is suppressed.

Specifically, the precipitation of a coarse Mg—Bi compound is suppressed by setting the hot rolling finish temperature to 250° C. to 350° C. and controlling the cooling rate from the finish temperature to 200° C. to be faster than −20° C./hr.

Thereafter, through cold rolling or the like, an aluminum alloy clad material 1 of the present invention in which a brazing material 3 is disposed on one surface of a core material 2 and a sacrificial material 4 is disposed on the other surface of the core material 2 as illustrated in FIG. 1 is obtained.

In the cold rolling, for example, cold rolling can be performed with a total reduction rate of 75% or more, process annealing can be performed at a temperature of 200° C. to 450° C., and then final rolling with a reduction rate of 40% can be performed. In cold rolling, the Mg—Bi compound is less likely to be crushed and does not deviate from the size and number density targeted by the present invention, so that the conditions are not particularly limited. Further, process annealing may not be performed, or H2n grade that has been finished by final annealing may be applied.

The aluminum alloy clad material obtained in the above process is subjected to brazing as an assembly combined with other constituent members 10 (fin, tube, side plate, and the like illustrated in FIG. 1) as the constituent members of the heat exchanger.

The assembly is disposed in a heating furnace having a non-oxidizing atmosphere under a normal pressure. A non-oxidizing gas can be constituted using an inert gas such as nitrogen gas, argon, a reducing gas such as hydrogen or ammonia, or a mixed gas thereof. Although the pressure of the atmosphere in a brazing furnace is basically the normal pressure, for example, in order to improve a gas replacement efficiency inside a product, a medium to low vacuum of about 100 kPa to 0.1 Pa in a temperature range before melting the brazing material may be employed, or a positive pressure of 5 to 100 Pa from the atmospheric pressure may be employed in order to suppress the infiltration of outside air (atmosphere) into the furnace.

The heating furnace does not need to have a sealed space, and may be a tunnel type having a carry-in port and a carry-out port for the brazing material. Even in such a heating furnace, non-oxidizing properties are maintained by continuously blowing the inert gas into the furnace. The non-oxidizing atmosphere desirably has an oxygen concentration of 50 ppm or less by volume ratio.

In the above atmosphere, for example, heating is performed at a temperature rising rate of 10 to 200° C./min, and braze joining is performed under heat treatment conditions in which an attainment temperature of the assembly is 559° C. to 630° C.

Under the brazing conditions, the brazing time is shortened as the temperature rising rate is increased, so that the growth of an oxide film on a material surface is suppressed and the brazability is improved. Brazing is possible when the attainment temperature is equal to or higher than at least the solidus temperature of the brazing material. However, the brazing material which flows increases in amount as the temperature approaches the liquidus temperature, and a good joined state is easily obtained at a joint having an open portion. However, when the temperature is too high, brazing erosion tends to proceed, and the structural dimensional accuracy of the assembly after brazing decreases, which is not preferable.

Figure 2:
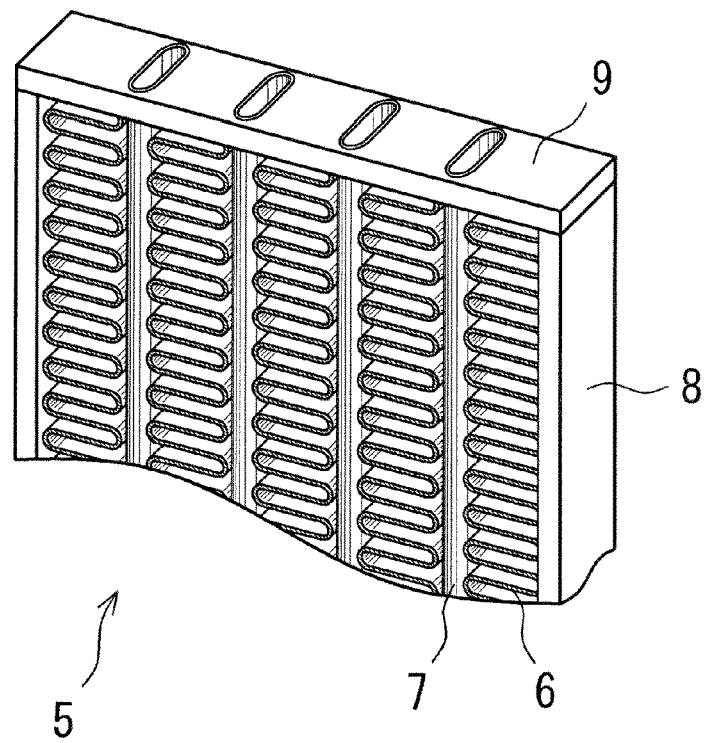
FIG. 2 is a perspective view illustrating an aluminum heat exchanger for a vehicle according to the embodiment of the present invention.

FIG. 2 illustrates an aluminum heat exchanger 5 in which fins 6 are formed using the aluminum alloy clad material 1 and a tube 7 made of an aluminum alloy is used as a brazing target material. The fin 6 and the tube 7 are assembled with a reinforcing member 8 and a header plate 9 to obtain the aluminum heat exchanger 5 for a vehicle or the like by flux-free brazing.

Example 1

Various aluminum alloy clad materials having the compositions shown in Tables 1 to 3 and Tables 5 to 7 (balance consisting of Al and inevitable impurities) were produced into hot rolled sheets under the casting conditions, homogenization conditions (brazing material), and hot rolling conditions shown in Table 9. In addition, "-" in the component indicates that the content is 0 or the amount as an inevitable impurity.

Thereafter, cold rolled sheets having a thickness of 0.30 mm and having an H14 equivalent grade were produced by cold rolling including process annealing. The clad ratio of each layer was 10% for the sacrificial material and 8% for the brazing material.

Moreover, as the brazing target member, a corrugated fin of an aluminum bare material (0.06 mm thickness) of JIS A3003 alloy and H14 was prepared.

A tube having a width of 25 mm was produced using the aluminum alloy clad material, and the tube and the corrugated fin were combined so that the tube brazing material and the corrugated fin are in contact with each other, thereby forming a core having a 15-stage tube and a length of 300 mm as a brazing evaluation model. The core was heated to 600° C. and held for 5 minutes in a brazing furnace in a nitrogen atmosphere (oxygen content 30 ppm), and the brazed state was evaluated. Here, a heat input amount from room temperature to 550° C. (the integral of the product of the diffusion coefficient of Zn and time during a brazing heat treatment) was set to $6 \times 10^{-11}$ m$^2$, a heat input amount until the completion of the brazing was set to $8 \times 10^{-10}$ m$^2$, and cooling to room temperature was performed after the end of the brazing at a cooling rate of 100° C./min. The brazing conditions are not limited to the above.

For each specimen in the examples, the following evaluation was performed, and the evaluation results are shown in Tables 4 and 8.

Brazability

Joint Ratio

A joint ratio was obtained by the following formula, and superiority and inferiority between samples were evaluated.

Fin joint ratio=(total brazing length of fin and tube/ total contact length of fin and tube)×100

Figure 3:
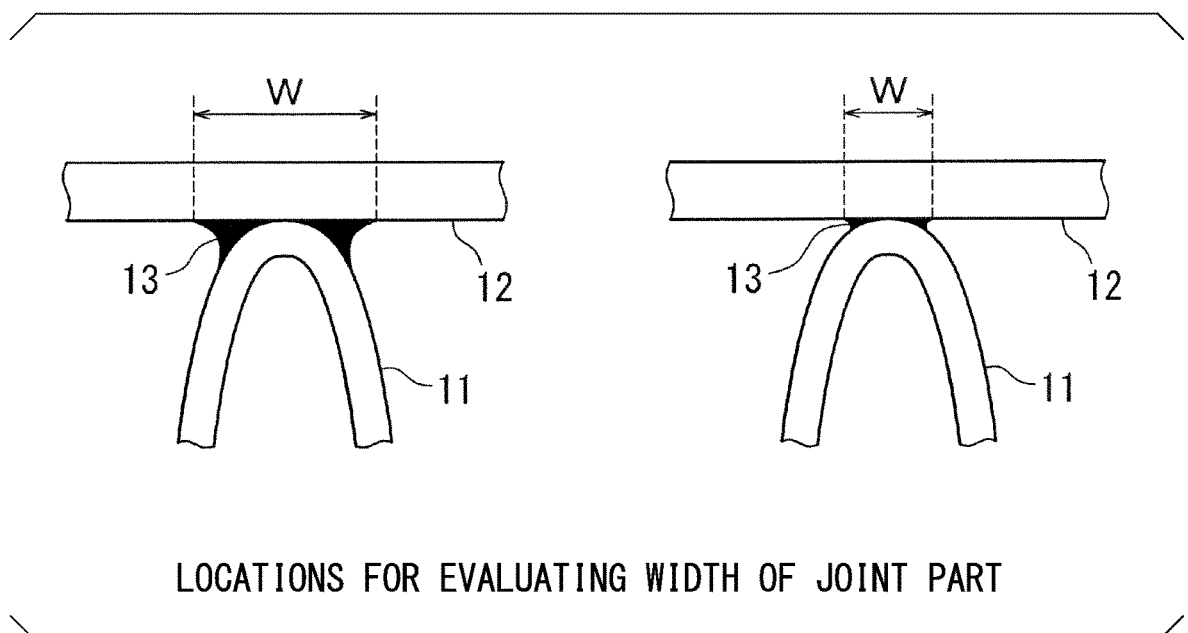
FIG. 3 is a view illustrating a brazing evaluation model in an example of the present invention.

Regarding the joint ratio, 90% or more was evaluated as O, and less than 90% was evaluated as X Fillet Length A sample cut out from the core was embedded in a resin and mirror-polished, and a fillet length W at a joint 13 between a fin 11 and a tube 12 was measured using an optical microscope as shown in FIG. 3. The number of joints 13 to be measured was 20 and the average thereof was taken as the fillet length to evaluate superiority or inferiority.

In the fillet length, 800 m or more was evaluated as A, 700 m or more and less than 800 μm as B, 600 μm or more and less than 700 μm as C, 500 μm or more and less than 600 μm as D, and less than 500 m as E.

Coarse Crystal Phase Si Particles

A produced brazing sheet was embedded in a resin, a cross section thereof parallel to a rolling direction was mirror-polished, the structure thereof was revealed with Barker's solution and then observed with an optical microscope to evaluate the formation state of coarse primary state Si in a brazing material layer. Observation was performed on a visual field of 300 μm at 10 points.

A case where coarse Si particles having an equivalent circle diameter of 30 μm or more were less than 2 in number was evaluated as A, a range from 2 to 9 was evaluated as B, and a case of 10 or more particles was evaluated as C.

Strength after Brazing

The brazing sheet was placed in a furnace in a drop form, and a brazing equivalent heat treatment was performed under the brazing conditions. Thereafter, the sample was cut out, a tensile test was conducted at room temperature by a normal method based on JIS, and a tensile strength was evaluated.

Regarding the strength after brazing, 190 MPa or more was evaluated as A, 180 MPa or more and less than 190 MPa as B, 145 MPa or more and less than 180 MPa as C, and less than 145 MPa as D.

Corrosion Resistance

The brazing sheet was placed in the furnace in a drop form, and the brazing equivalent heat treatment was performed under the brazing conditions. Thereafter, the sample was cut into a size of 30 mm×80 mm, masked except for a sacrificial material surface, and then subjected to SWAAT for 30 days. Corrosion products were removed from the sample after the corrosion test with chromic acid phosphate, and the corrosion depth was measured by observing the cross section of a maximum corrosion portion.

Regarding the corrosion resistance, a case where the corrosion depth was in the sacrificial material layer was evaluated as A, exceeding the sacrificial material layer to ¼ of the sheet thickness as B, exceeding the sacrificial material layer to half the sheet thickness as C, not penetrated although exceeding half the sheet thickness as D. Among the test materials that were penetrated in SWAAT for 30 days, a case where there was no penetration in 20 days but penetration occurred after 20 days was evaluated as E, and a case where penetration occurred in 20 days was evaluated as F.

Mg Concentration of Surface of Brazing Material at Braze Melting Temperature

The brazing equivalent heat treatment was performed under the above brazing conditions, the sample was taken out from the furnace at the moment when the braze melting temperature (a solidus temperature was calculated from the components using the phase diagram calculation software JMatPro, and a temperature subtracted by 10° C. from the solidus temperature) was reached, the sample was embedded in a resin and mirror-polished, and the Mg concentration on the surface of the brazing material was measured by EPMA analysis in a cross-sectional direction. In the measured EPMA data, the average Mg concentration in a range of 5 μm from the surface of the brazing material was taken as the Mg concentration on the surface of the brazing material.

Since the braze melting temperature varies depending on the components of a material, the solidus temperature was obtained using the phase diagram calculation software (JMatPro), and the temperature subtracted by 10° C. from the solidus temperature was treated as the braze melting temperature.

Cu Concentration on Surface of Sacrificial Material after Brazing

The brazing equivalent heat treatment was performed under the brazing conditions, the sample after the brazing was embedded in a resin and mirror-polished, and the Cu concentration on the surface of the sacrificial material was measured by EPMA analysis in a cross-sectional direction. In the measured EPMA data, the average Cu concentration in a range of 5 μm from the surface was taken as the Cu concentration on the surface of the sacrificial material.

TABLE 1

| | Specimen No. | Elements added to brazing material [wt %] | | | | Manufacturing method | Mg—Bi compound [/10,000 μm$^2$] | | (Bi + Mg) × Sr |
|---|---|---|---|---|---|---|---|---|---|
| | | Mg | Si | Bi | Sr | | Less than 5 μm | 5 μm or more | |
| Example | 1 | 0.05 | 11.0 | 0.15 | 0.0005 | E | 24 | 0 | 0.0001 |
| | 2 | 0.1 | 11.0 | 0.15 | 0.0005 | E | 39 | 0 | 0.000125 |
| | 3 | 0.2 | 11.0 | 0.15 | 0.0005 | E | 41 | 0 | 0.000175 |
| | 4 | 0.6 | 11.0 | 0.15 | 0.0005 | F | 35 | 0 | 0.000375 |
| | 5 | 0.9 | 11.0 | 0.23 | 0.007 | H | 44 | 0 | 0.00791 |
| | 6 | 0.9 | 11.0 | 0.23 | 0.007 | H | 44 | 0 | 0.00791 |
| | 7 | 1.2 | 11.0 | 0.23 | 0.007 | H | 44 | 0 | 0.01001 |
| | 8 | 1.4 | 11.0 | 0.23 | 0.007 | H | 44 | 0 | 0.01141 |
| | 9 | 0.5 | 6.0 | 0.23 | 0.008 | I | 54 | 0 | 0.00584 |
| | 10 | 0.3 | 9.0 | 0.20 | 0.007 | B | 34 | 0 | 0.0035 |
| | 11 | 0.3 | 13.0 | 0.10 | 0.005 | E | 38 | 0 | 0.002 |
| | 12 | 0.5 | 14.0 | 0.20 | 0.005 | G | 55 | 1 | 0.0035 |
| | 13 | 0.3 | 11.5 | 0.05 | 0.005 | I | 32 | 0 | 0.00175 |
| | 14 | 0.5 | 11.5 | 0.08 | 0.008 | F | 33 | 0 | 0.00464 |
| | 15 | 0.5 | 11.5 | 0.23 | 0.006 | A | 40 | 0 | 0.00438 |
| | 16 | 0.5 | 11.5 | 0.25 | 0.006 | B | 46 | 0 | 0.0045 |
| | 17 | 0.5 | 12.5 | 0.15 | 0.0001 | E | 38 | 0 | 0.000065 |
| | 18 | 0.5 | 12.5 | 0.15 | 0.0005 | F | 31 | 0 | 0.000325 |
| | 19 | 0.2 | 12.5 | 0.15 | 0.05 | I | 33 | 0 | 0.0175 |
| | 20 | 0.05 | 12.5 | 0.15 | 0.1 | E | 22 | 0 | 0.02 |
| | 21 | 0.1 | 12.5 | 0.15 | 0.1 | E | 35 | 0 | 0.025 |
| | 22 | 0.5 | 11.5 | 0.15 | 0.008 | E | 37 | 0 | 0.0052 |
| | 23 | 0.5 | 11.5 | 0.20 | 0.006 | A | 38 | 0 | 0.0042 |
| | 24 | 0.5 | 11.5 | 0.20 | 0.007 | D | 43 | 0 | 0.0049 |
| | 25 | 0.5 | 11.5 | 0.20 | 0.008 | B | 33 | 0 | 0.0056 |
| | 26 | 0.5 | 11.5 | 0.20 | 0.01 | F | 47 | 0 | 0.007 |
| | 27 | 1.2 | 11.5 | 0.20 | 0.01 | B | 33 | 0 | 0.014 |
| | 28 | 1.2 | 11.5 | 0.20 | 0.009 | J | 66 | 1 | 0.0126 |
| | 29 | 1.0 | 11.5 | 0.20 | 0.01 | A | 41 | 0 | 0.012 |
| | 30 | 1.0 | 11.5 | 0.20 | 0.08 | B | 36 | 0 | 0.096 |

TABLE 1-continued

| | Elements added to brazing material [wt %] | | | | Manufacturing | Mg—Bi compound [/10,000 μm²] | | |
|---|---|---|---|---|---|---|---|---|
| Specimen No. | Mg | Si | Bi | Sr | method | Less than 5 μm | 5 μm or more | (Bi + Mg) × Sr |
| 31 | 0.3 | 11.5 | 0.20 | 0.004 | I | 55 | 0 | 0.002 |
| 32 | 0.3 | 11.5 | 0.15 | 0.007 | E | 41 | 0 | 0.00315 |
| 33 | 0.3 | 11.5 | 0.15 | 0.005 | G | 33 | 0 | 0.00225 |
| 34 | 0.3 | 11.5 | 0.15 | 0.01 | J | 47 | 0 | 0.0045 |
| 35 | 0.8 | 11.5 | 0.15 | 0.01 | I | 35 | 0 | 0.0095 |
| 36 | 0.8 | 11.5 | 0.20 | 0.08 | C | 38 | 0 | 0.08 |
| 37 | 0.5 | 11.5 | 0.20 | 0.008 | D | 44 | 0 | 0.0056 |
| 38 | 0.5 | 11.5 | 0.15 | 0.01 | I | 38 | 0 | 0.0065 |
| 39 | 0.5 | 11.5 | 0.15 | 0.009 | J | 42 | 0 | 0.00585 |
| 40 | 0.5 | 11.5 | 0.20 | 0.01 | H | 43 | 0 | 0.007 |
| 41 | 0.5 | 11.5 | 0.20 | 0.006 | A | 41 | 0 | 0.0042 |
| 42 | 0.5 | 11.5 | 0.20 | 0.0002 | J | 66 | 1 | 0.00014 |
| 43 | 0.5 | 11.5 | 0.23 | 0.01 | B | 47 | 0 | 0.0073 |
| 44 | 0.5 | 11.5 | 0.12 | 0.01 | F | 33 | 0 | 0.0062 |
| 45 | 0.5 | 11.5 | 0.20 | 0.008 | B | 34 | 0 | 0.0056 |
| 46 | 0.5 | 11.5 | 0.15 | 0.01 | G | 36 | 0 | 0.0065 |
| 47 | 0.3 | 10.0 | 0.20 | 0.009 | B | 34 | 0 | 0.0045 |
| 48 | 0.3 | 10.0 | 0.20 | 0.009 | B | 34 | 0 | 0.0045 |
| 49 | 0.3 | 10.0 | 0.20 | 0.009 | B | 34 | 0 | 0.0045 |
| 50 | 0.3 | 10.0 | 0.20 | 0.009 | B | 34 | 0 | 0.0045 |
| 51 | 0.3 | 10.0 | 0.20 | 0.01 | B | 34 | 0 | 0.005 |
| 52 | 0.3 | 10.0 | 0.20 | 0.005 | B | 34 | 0 | 0.0025 |
| 53 | 0.3 | 10.0 | 0.20 | 0.01 | B | 34 | 0 | 0.005 |
| 54 | 0.3 | 10.0 | 0.20 | 0.01 | B | 34 | 0 | 0.005 |
| 55 | 0.3 | 10.0 | 0.20 | 0.007 | B | 34 | 0 | 0.0035 |
| 56 | 0.3 | 10.0 | 0.20 | 0.01 | B | 34 | 0 | 0.005 |
| 57 | 0.3 | 10.0 | 0.20 | 0.006 | B | 34 | 0 | 0.003 |
| 58 | 0.3 | 10.0 | 0.20 | 0.004 | B | 34 | 0 | 0.002 |
| 59 | 0.3 | 7.5 | 0.20 | 0.002 | B | 34 | 0 | 0.001 |
| 60 | 0.8 | 11.0 | 0.20 | 0.08 | E | 35 | 0 | 0.08 |
| 61 | 0.5 | 11.5 | 0.20 | 0.01 | C | 38 | 0 | 0.007 |
| 62 | 0.5 | 11.5 | 0.15 | 0.008 | E | 37 | 0 | 0.0052 |
| 63 | 0.5 | 11.5 | 0.2 | 0.01 | C | 38 | 0 | 0.007 |
| 64 | 0.5 | 11.5 | 0.15 | 0.01 | G | 33 | 0 | 0.0065 |
| 65 | 0.5 | 11.5 | 0.20 | 0.007 | H | 44 | 0 | 0.0049 |
| 66 | 0.3 | 11.5 | 0.20 | 0.01 | A | 42 | 0 | 0.005 |
| 67 | 0.5 | 11.5 | 0.2 | 0.01 | C | 38 | 0 | 0.007 |

TABLE 2

| | | Core material composition [wt %] | | | | | | Concentration of Mg on surface of brazing |
|---|---|---|---|---|---|---|---|---|
| Specimen No. | | Si | Mg | Mn | Cu | Ti | Fe | material (wt %) |
| Example | 1 | 0.7 | 0.5 | 1.2 | 0.4 | — | 0.2 | 0.07 |
| | 2 | 0.7 | 0.5 | 1.2 | 0.4 | — | 0.2 | 0.15 |
| | 3 | 0.7 | 0.5 | 1.2 | 0.4 | — | 0.2 | 0.21 |
| | 4 | 0.7 | 0.5 | 1.2 | 0.4 | — | 0.2 | 0.59 |
| | 5 | 0.7 | 0.1 | 1.2 | 0.4 | 0.15 | 0.2 | 0.85 |
| | 6 | 0.7 | 0.5 | 1.2 | 0.4 | 0.15 | 0.2 | 0.9 |
| | 7 | 0.7 | — | 1.2 | 0.4 | 0.15 | 0.2 | 1.1 |
| | 8 | 0.7 | 0.5 | 1.2 | 0.4 | 0.15 | 0.2 | 1.32 |
| | 9 | 0.7 | 0.5 | 1.2 | 0.4 | 0.15 | 0.2 | 0.5 |
| | 10 | 0.7 | 0.5 | 1.2 | 0.4 | 0.15 | 0.2 | 0.31 |
| | 11 | 0.7 | 0.5 | 1.2 | 0.4 | 0.15 | 0.2 | 0.31 |
| | 12 | 0.7 | 0.5 | 1.2 | 0.4 | 0.1 | 0.2 | 0.5 |
| | 13 | 0.7 | 0.5 | 1.2 | 0.4 | 0.1 | 0.2 | 0.31 |
| | 14 | 0.7 | 0.5 | 1.2 | 0.4 | 0.1 | 0.2 | 0.5 |
| | 15 | 0.7 | 0.5 | 1.2 | 0.4 | 0.1 | 0.2 | 0.5 |
| | 16 | 0.7 | 0.5 | 1.2 | 0.4 | 0.1 | 0.2 | 0.5 |
| | 17 | 0.7 | 0.5 | 1.2 | 0.4 | — | 0.2 | 0.5 |
| | 18 | 0.7 | — | 1.2 | 0.4 | — | 0.2 | 0.47 |
| | 19 | 0.7 | — | 1.2 | 0.4 | — | 0.2 | 0.20 |
| | 20 | 0.7 | — | 1.2 | 0.4 | — | 0.2 | 0.03 |
| | 21 | 0.7 | — | 1.2 | 0.4 | — | 0.2 | 0.08 |
| | 22 | 0.5 | — | 1.2 | 0.4 | — | 0.2 | 0.45 |
| | 23 | 0.6 | — | 1.2 | 0.4 | — | 0.2 | 0.46 |
| | 24 | 0.9 | — | 1.2 | 0.4 | — | 0.2 | 0.44 |
| | 25 | 1.0 | — | 1.2 | 0.4 | — | 0.2 | 0.47 |
| | 26 | 0.75 | 0.1 | 1.2 | 0.6 | — | 0.2 | 0.49 |
| | 27 | 0.75 | 0.2 | 1.2 | 0.6 | — | 0.2 | 1.05 |

TABLE 2-continued

| Specimen No. | Core material composition [wt %] | | | | | | Concentration of Mg on surface of brazing material (wt %) |
|---|---|---|---|---|---|---|---|
| | Si | Mg | Mn | Cu | Ti | Fe | |
| 28 | 0.75 | 0.65 | 1.2 | 0.6 | — | 0.2 | 1.15 |
| 29 | 0.75 | 0.7 | 1.2 | 0.6 | — | 0.2 | 0.95 |
| 30 | 0.7 | 0.5 | 1.1 | 0.55 | — | 0.2 | 0.95 |
| 31 | 0.7 | 0.5 | 1.2 | 0.55 | — | 0.2 | 0.307 |
| 32 | 0.7 | 0.5 | 1.6 | 0.55 | — | 0.2 | 0.307 |
| 33 | 0.7 | 0.5 | 1.7 | 0.55 | — | 0.2 | 0.307 |
| 34 | 0.85 | 0.5 | 1.2 | 0.1 | — | 0.2 | 0.307 |
| 35 | 0.85 | 0.5 | 1.2 | 0.15 | — | 0.2 | 0.78 |
| 36 | 0.85 | 0.5 | 1.2 | 0.6 | — | 0.2 | 0.75 |
| 37 | 0.5 | 0.5 | 1.2 | 0.4 | — | 0.10 | 0.5 |
| 38 | 0.5 | 0.5 | 1.2 | 0.4 | — | 0.12 | 0.5 |
| 39 | 0.5 | 0.5 | 1.2 | 0.4 | — | 0.4 | 0.5 |
| 40 | 0.5 | — | 1.2 | 0.4 | — | 0.5 | 0.47 |
| 41 | 0.7 | — | 1.2 | 0.4 | — | 0.2 | 0.46 |
| 42 | 0.7 | — | 1.2 | 0.4 | — | 0.2 | 0.45 |
| 43 | 0.7 | — | 1.2 | 0.4 | — | 0.2 | 0.45 |
| 44 | 0.7 | — | 1.2 | 0.4 | — | 0.2 | 0.45 |
| 45 | 0.7 | — | 1.2 | 0.4 | — | 0.2 | 0.44 |
| 46 | 0.7 | — | 1.2 | 0.4 | — | 0.2 | 0.43 |
| 47 | 0.7 | — | 1.2 | 0.4 | — | 0.2 | 0.29 |
| 48 | 0.7 | — | 1.2 | 0.4 | — | 0.2 | 0.28 |
| 49 | 0.7 | — | 1.2 | 0.4 | — | 0.2 | 0.29 |
| 50 | 0.7 | — | 1.2 | 0.4 | — | 0.2 | 0.27 |
| 51 | 0.7 | — | 1.2 | 0.4 | 0.2 | 0.2 | 0.28 |
| 52 | 0.7 | 0.5 | 1.2 | 0.4 | 0.2 | 0.2 | 0.31 |
| 53 | 0.7 | 0.5 | 1.2 | 0.4 | 0.2 | 0.2 | 0.31 |
| 54 | 0.7 | 0.5 | 1.2 | 0.4 | 0.2 | 0.2 | 0.31 |
| 55 | 0.7 | 0.5 | 1.2 | 0.4 | 0.08 | 0.2 | 0.31 |
| 56 | 0.7 | 0.5 | 1.2 | 0.4 | 0.08 | 0.2 | 0.31 |
| 57 | 0.7 | 0.5 | 1.2 | 0.4 | 0.08 | 0.2 | 0.31 |
| 58 | 0.7 | 0.5 | 1.2 | 0.4 | 0.08 | 0.2 | 0.31 |
| 59 | 0.7 | 0.5 | 1.2 | 0.4 | — | 0.2 | 0.31 |
| 60 | 0.7 | 0.2 | 1.4 | 0.4 | — | 0.2 | 0.75 |
| 61 | 0.85 | — | 1.2 | 0.7 | — | 0.2 | 0.45 |
| 62 | 0.2 | — | 1.2 | 0.4 | — | 0.2 | 0.45 |
| 63 | 0.85 | — | 1.2 | 1.0 | — | 0.2 | 0.45 |
| 64 | 0.4 | — | 1.2 | 0.2 | — | 0.2 | 0.47 |
| 65 | 0.7 | — | 1.2 | 0.08 | 0.15 | 0.2 | 0.47 |
| 66 | 0.1 | — | 1.4 | 0.9 | 0.15 | 0.2 | 0.28 |
| 67 | 0.85 | — | 1.2 | 0.85 | — | 0.2 | 0.45 |

TABLE 3

| Specimen No. | | Sacrificial material composition [wt %] | | | | | | |
|---|---|---|---|---|---|---|---|---|
| | | Zn | Mn | Si | Fe | Cr | Ti | Mg |
| Example | 1 | 3.0 | — | — | 0.3 | — | — | — |
| | 2 | 3.0 | — | — | 0.3 | — | — | — |
| | 3 | 3.0 | — | — | 0.3 | — | — | 0.01 |
| | 4 | 3.0 | — | — | 0.3 | — | — | 0.2 |
| | 5 | 3.0 | — | — | 0.3 | — | — | 0.07 |
| | 6 | 3.0 | — | — | 0.3 | — | — | 0.07 |
| | 7 | 3.0 | — | — | 0.3 | — | — | 0.07 |
| | 8 | 3.0 | — | — | 0.3 | — | — | 0.07 |
| | 9 | 3.0 | — | — | 0.3 | — | — | — |
| | 10 | 3.0 | — | — | 0.3 | — | — | — |
| | 11 | 3.0 | — | — | 0.3 | — | — | — |
| | 12 | 3.0 | — | — | 0.5 | — | — | 0.03 |
| | 13 | 3.0 | — | — | 0.5 | — | — | — |
| | 14 | 3.0 | — | 0.5 | — | — | — | — |
| | 15 | 3.0 | — | 0.5 | — | — | — | — |
| | 16 | 3.0 | — | 0.5 | — | — | — | 0.06 |
| | 17 | 3.0 | — | 0.5 | 0.3 | — | — | — |
| | 18 | 3.0 | — | 0.5 | 0.3 | — | — | — |
| | 19 | 3.0 | 0.8 | — | 0.3 | — | — | — |
| | 20 | 3.0 | 0.8 | — | 0.3 | — | — | — |
| | 21 | 3.0 | 0.8 | — | 0.3 | — | — | — |
| | 22 | 3.0 | 0.8 | — | 0.5 | — | — | — |
| | 23 | 3.0 | 0.8 | — | 0.5 | — | 0.1 | — |
| | 24 | 3.0 | 0.8 | — | 0.5 | — | 0.1 | — |
| | 25 | 3.0 | 0.8 | — | 0.5 | — | 0.1 | 0.05 |
| | 26 | 3.0 | 0.5 | — | — | — | 0.05 | — |
| | 27 | 3.0 | 0.5 | — | — | — | 0.3 | — |
| | 28 | 3.0 | 0.5 | — | — | — | — | — |
| | 29 | 3.0 | 0.5 | — | — | — | — | — |
| | 30 | 3.0 | 0.5 | — | — | — | — | — |
| | 31 | 3.0 | 0.5 | — | — | 0.05 | — | — |
| | 32 | 3.0 | — | — | — | 0.5 | — | — |
| | 33 | 3.0 | — | — | — | 0.2 | — | 0.25 |
| | 34 | — | — | — | — | 0.2 | — | — |
| | 35 | — | — | — | — | 0.2 | — | — |
| | 36 | — | — | — | — | 0.2 | — | — |
| | 37 | 3.0 | 0.8 | — | — | 0.2 | — | — |
| | 38 | 3.0 | 0.8 | 0.5 | — | — | — | — |
| | 39 | 3.0 | 0.8 | 0.5 | — | — | — | — |
| | 40 | 3.0 | 0.8 | 0.5 | — | — | — | — |
| | 41 | 0.2 | 0.5 | — | 0.3 | 0.1 | — | — |
| | 42 | 6.0 | 0.5 | — | 0.3 | 0.1 | — | — |
| | 43 | 3.0 | 0.3 | — | 0.3 | — | — | — |
| | 44 | 3.0 | 1.3 | — | 0.3 | — | — | — |
| | 45 | 3.0 | 0.5 | 0.2 | — | — | — | — |
| | 46 | 3.0 | — | 0.8 | 0.3 | — | — | — |
| | 47 | — | — | — | — | — | — | — |
| | 48 | 0.2 | — | — | — | — | — | — |
| | 49 | 0.5 | — | — | — | — | — | — |
| | 50 | 0.65 | — | — | — | — | — | — |

TABLE 3-continued

| Specimen No. | Sacrificial material composition [wt %] | | | | | | |
|---|---|---|---|---|---|---|---|
| | Zn | Mn | Si | Fe | Cr | Ti | Mg |
| 51 | 2.0 | — | — | — | — | — | — |
| 52 | 3.0 | — | — | — | — | — | — |
| 53 | 2.0 | 0.5 | — | — | — | — | — |
| 54 | 2.0 | — | 0.5 | — | — | — | — |
| 55 | 2.0 | — | — | — | 0.2 | — | — |
| 56 | — | — | — | — | — | — | 0.04 |
| 57 | — | — | — | — | — | — | 0.1 |
| 58 | — | — | — | — | — | — | 0.22 |
| 59 | — | — | — | — | — | — | 0.29 |
| 60 | 3.0 | — | — | — | — | — | — |
| 61 | — | — | — | — | 0.2 | — | — |
| 61 | — | — | — | — | 0.2 | — | — |
| 62 | 3.0 | 0.8 | — | 0.5 | — | — | — |
| 63 | — | — | — | — | 0.2 | — | — |
| 64 | 3.0 | 0.8 | — | 0.5 | — | — | — |
| 65 | — | — | — | — | 0.2 | — | — |
| 66 | — | — | — | — | 0.2 | — | — |
| 67 | — | — | — | — | 0.2 | — | — |

TABLE 4

| | | Brazability | | | Corrosion resistance | | | |
|---|---|---|---|---|---|---|---|---|
| Specimen No. | | Joint ratio | Fillet length | Coarse Si particles | Concentration of Cu on surface of sacrificial material Cu [wt %] | Corrosion depth | Strength after brazing [MPa] | Evaluation |
| Example | 1 | O | D | A | 0.07 | A | 182 | B |
| | 2 | O | C | A | 0.07 | A | 182 | B |
| | 3 | O | B | A | 0.07 | A | 183 | B |
| | 4 | O | A | A | 0.07 | A | 185 | B |
| | 5 | O | A | A | 0.07 | A | 168 | C |
| | 6 | O | B | A | 0.07 | A | 186 | C |
| | 7 | O | C | A | 0.07 | A | 165 | C |
| | 8 | O | D | A | 0.07 | A | 189 | C |
| | 9 | O | D | A | 0.07 | A | 184 | B |
| | 10 | O | B | A | 0.07 | A | 183 | B |
| | 11 | O | B | A | 0.07 | A | 183 | B |
| | 12 | O | D | A | 0.07 | A | 184 | B |
| | 13 | O | C | A | 0.07 | A | 183 | B |
| | 14 | O | B | A | 0.07 | A | 186 | B |
| | 15 | O | B | A | 0.07 | A | 186 | B |
| | 16 | O | C | A | 0.07 | A | 186 | B |
| | 17 | O | B | A | 0.07 | A | 186 | B |
| | 18 | O | B | A | 0.07 | A | 164 | C |
| | 19 | O | B | A | 0.07 | A | 162 | C |
| | 20 | O | D | A | 0.07 | A | 162 | C |
| | 21 | O | D | A | 0.07 | A | 162 | C |
| | 22 | O | B | A | 0.07 | A | 157 | C |
| | 23 | O | B | A | 0.07 | A | 160 | C |
| | 24 | O | B | A | 0.07 | A | 172 | C |
| | 25 | O | C | A | 0.07 | A | 176 | C |
| | 26 | O | A | A | 0.10 | A | 176 | C |
| | 27 | O | D | A | 0.09 | A | 184 | B |
| | 28 | O | A | A | 0.10 | A | 205 | A |
| | 29 | O | B | A | 0.10 | A | 206 | A |
| | 30 | O | C | B | 0.07 | A | 192 | A |
| | 31 | O | A | A | 0.07 | A | 190 | A |
| | 32 | O | B | A | 0.07 | A | 194 | A |
| | 33 | O | B | A | 0.07 | A | 196 | A |
| | 34 | O | A | A | 0.02 | B | 177 | C |
| | 35 | O | B | A | 0.03 | B | 181 | B |
| | 36 | O | B | B | 0.11 | D | 198 | A |
| | 37 | O | B | A | 0.07 | A | 178 | C |
| | 38 | O | B | A | 0.07 | A | 180 | B |
| | 39 | O | B | A | 0.07 | A | 182 | B |
| | 40 | O | A | A | 0.07 | A | 160 | C |
| | 41 | O | B | A | 0.07 | A | 163 | C |
| | 42 | O | A | A | 0.07 | A | 163 | C |
| | 43 | O | A | A | 0.07 | A | 162 | C |
| | 44 | O | B | A | 0.07 | A | 165 | C |
| | 45 | O | B | A | 0.07 | A | 164 | C |
| | 46 | O | B | A | 0.07 | A | 165 | C |
| | 47 | O | B | A | 0.07 | D | 160 | C |
| | 48 | O | B | A | 0.07 | C | 160 | C |
| | 49 | O | B | A | 0.07 | B | 160 | C |
| | 50 | O | B | A | 0.07 | A | 160 | C |
| | 51 | O | B | A | 0.07 | B | 160 | C |

TABLE 4-continued

| | Brazability | | | Corrosion resistance | | | |
|---|---|---|---|---|---|---|---|
| | | | Coarse | Concentration of Cu on surface of sacrificial | | | |
| Specimen No. | Joint ratio | Fillet length | Si particles | material Cu [wt %] | Corrosion depth | Strength after brazing [MPa] | Evaluation |
| 52 | O | B | A | 0.07 | B | 183 | B |
| 53 | O | B | A | 0.07 | A | 184 | B |
| 54 | O | B | A | 0.07 | A | 185 | B |
| 55 | O | B | A | 0.07 | A | 183 | B |
| 56 | O | B | A | 0.07 | B | 183 | B |
| 57 | O | B | A | 0.07 | B | 183 | B |
| 58 | O | B | A | 0.07 | A | 183 | B |
| 59 | O | C | A | 0.07 | A | 183 | B |
| 60 | O | B | B | 0.07 | A | 172 | C |
| 61 | O | B | A | 0.13 | C | 178 | C |
| 62 | O | B | A | 0.07 | A | 150 | C |
| 63 | O | B | A | 0.18 | E | 188 | B |
| 64 | O | C | A | 0.07 | A | 146 | C |
| 65 | O | C | A | 0.015 | A | 149 | C |
| 66 | O | C | A | 0.14 | E | 159 | C |
| 67 | O | C | A | 0.15 | D | 183 | B |

TABLE 5

| | | Elements added to brazing material [wt %] | | | | Manufacturing method | Mg—Bi compound [/10,000 μm²] | | (Bi + Mg) × Sr |
|---|---|---|---|---|---|---|---|---|---|
| Specimen No. | | Mg | Si | Bi | Sr | | Less than 5 μm | 5 μm or more | |
| Comparative Example | 1 | 0.02 | 11.0 | 0.11 | 0.0005 | B | 17 | 0 | 0.000065 |
| | 2 | 1.55 | 11.0 | 0.15 | 0.0005 | E | 32 | 0 | 0.00085 |
| | 3 | 0.5 | 5.5 | 0.23 | 0.01 | A | 42 | 0 | 0.0073 |
| | 4 | 1.3 | 14.5 | 0.20 | 0.08 | I | 55 | 1 | 0.12 |
| | 5 | 0.1 | 11.5 | 0.03 | 0.0005 | C | 24 | 0 | 0.000065 |
| | 6 | 0.5 | 11.5 | 0.28 | 0.01 | C | 45 | 1 | 0.0078 |
| | 7 | 0.5 | 12.5 | 0.15 | 0.00008 | C | 42 | 0 | 0.000052 |
| | 8 | 0.5 | 12.5 | 0.20 | 0.15 | C | 42 | 0 | 0.105 |
| | 9 | 0.5 | 11.5 | 0.15 | 0.005 | I | 36 | 0 | 0.00325 |
| | 10 | 0.5 | 11.5 | 0.15 | 0.01 | J | 46 | 1 | 0.0065 |
| | 11 | 0.5 | 11.5 | 0.20 | 0.006 | C | 35 | 0 | 0.0042 |
| | 12 | 0.3 | 11.5 | 0.20 | 0.005 | D | 45 | 0 | 0.0025 |
| | 13 | 0.3 | 11.5 | 0.20 | 0.01 | B | 35 | 0 | 0.005 |
| | 14 | 1.2 | 11.5 | 0.20 | 0.08 | B | 36 | 0 | 0.112 |
| | 15 | 1.2 | 11.5 | 0.15 | 0.04 | B | 34 | 0 | 0.054 |
| | 16 | 0.3 | 11.5 | 0.15 | 0.01 | K | 12 | 3 | 0.0045 |
| | 17 | 0.3 | 11.5 | 0.15 | 0.007 | N | 19 | 5 | 0.00315 |
| | 18 | 0.5 | 11.5 | 0.20 | 0.007 | O | 16 | 4 | 0.0049 |
| | 19 | 0.5 | 11.5 | 0.20 | 0.01 | L | 19 | 7 | 0.007 |
| | 20 | 0.5 | 11.5 | 0.15 | 0.008 | M | 15 | 6 | 0.0052 |
| | 21 | 0.5 | 11.5 | 0.15 | 0.01 | K | 13 | 5 | 0.0065 |
| | 22 | 1.0 | 11.5 | 0.12 | 0.006 | N | 18 | 3 | 0.00672 |
| | 23 | 0.5 | 11.5 | 0.28 | 0.01 | C | 45 | 1 | 0.0078 |
| | 24 | 0.5 | 11.5 | 0.20 | 0.007 | H | 44 | 0 | 0.0049 |
| | 25 | 0.5 | 11.5 | 0.15 | 0.01 | G | 33 | 0 | 0.0065 |
| | 26 | 0.3 | 11.5 | 0.20 | 0.01 | A | 42 | 0 | 0.005 |
| Reference Example | 1 | 0.5 | 11.5 | 0.15 | 0.0007 | | Cannot be evaluated | Cannot be evaluated | 0.000455 |
| | 2 | 0.5 | 11.5 | 0.15 | 0.01 | | Cannot be evaluated | Cannot be evaluated | 0.0065 |
| | 3 | 0.5 | 11.5 | 0.15 | 0.008 | | Cannot be evaluated | Cannot be evaluated | 0.0052 |
| | 4 | 0.5 | 11.5 | 0.15 | 0.009 | | Cannot be evaluated | Cannot be evaluated | 0.00585 |
| | 5 | 0.5 | 11.5 | 0.15 | 0.01 | | Cannot be evaluated | Cannot be evaluated | 0.0065 |
| | 6 | 0.3 | 10.0 | 0.20 | 0.01 | | Cannot be evaluated | Cannot be evaluated | 0.005 |

TABLE 6

| Specimen No. | | Core material composition [wt %] | | | | | | Concentration of Mg on surface of brazing material (wt %) |
|---|---|---|---|---|---|---|---|---|
| | | Si | Mg | Mn | Cu | Ti | Fe | |
| Comparative Example | 1 | 0.7 | 0.5 | 1.2 | 0.4 | — | 0.2 | 0.094 |
| | 2 | 0.7 | 0.5 | 1.2 | 0.4 | — | 0.2 | 1.5 |
| | 3 | 0.7 | 0.5 | 1.2 | 0.4 | — | 0.2 | 0.5 |
| | 4 | 0.7 | 0.5 | 1.2 | 0.4 | — | 0.2 | 1.2 |
| | 5 | 0.7 | 0.5 | 1.2 | 0.4 | — | 0.2 | 0.21 |
| | 6 | 0.5 | — | 0.9 | 0.4 | — | 0.2 | 0.48 |
| | 7 | 0.7 | — | 1.2 | 0.4 | — | 0.2 | 0.45 |
| | 8 | 0.7 | — | 1.2 | 0.4 | — | 0.2 | 0.47 |
| | 9 | 1.2 | 0.5 | 1.2 | 0.2 | — | 0.2 | 0.5 |
| | 10 | 0.7 | 0.2 | 1.2 | 0.4 | — | 0.2 | 0.49 |
| | 11 | 0.7 | 0.2 | 1.8 | 0.4 | — | 0.2 | 0.49 |
| | 12 | 0.5 | 0.3 | 1.2 | 0.4 | 0.15 | 0.08 | 0.3 |
| | 13 | 0.5 | 0.3 | 1.2 | 0.4 | 0.15 | 0.7 | 0.3 |
| | 14 | 0.7 | 0.5 | 1.8 | 0.4 | 0.2 | 0.2 | 1.1 |
| | 15 | 0.7 | 0.5 | 1.2 | 0.4 | 0.5 | 0.2 | 1.1 |
| | 16 | 0.7 | 0.5 | 1.2 | 0.4 | — | 0.2 | 0.307 |
| | 17 | 0.7 | 0.5 | 1.2 | 0.4 | — | 0.2 | 0.307 |
| | 18 | 0.7 | 0.5 | 1.2 | 0.4 | — | 0.2 | 0.5 |
| | 19 | 0.7 | 0.5 | 1.2 | 0.4 | — | 0.2 | 0.5 |
| | 20 | 0.7 | 0.5 | 1.2 | 0.4 | — | 0.2 | 0.5 |
| | 21 | 0.7 | 0.5 | 1.2 | 0.4 | — | 0.2 | 0.5 |
| | 22 | 0.7 | 0.5 | 1.2 | 0.4 | — | 0.2 | 0.5 |
| | 23 | 0.5 | — | 0.7 | 0.4 | — | 0.2 | 0.48 |
| | 24 | 0.7 | — | 1.2 | 0.04 | 0.15 | 0.2 | 0.47 |
| | 25 | 0.15 | — | 1.2 | 0.2 | — | 0.2 | 0.47 |
| | 26 | 0.1 | — | 1.4 | 1.1 | 0.15 | 0.2 | 0.28 |
| Reference Example | 1 | 0.7 | 0.5 | 1.2 | 0.4 | 0.5 | 0.4 | |
| | 2 | 0.7 | 0.5 | 1.2 | 0.4 | 0.5 | 0.2 | |
| | 3 | 0.7 | 1.5 | 1.2 | 0.4 | 0.3 | 0.2 | |
| | 4 | 0.7 | 0.5 | 1.7 | 0.4 | 0.3 | 0.2 | |
| | 5 | 0.7 | 0.5 | 1.7 | 0.4 | — | 0.4 | |
| | 6 | 0.7 | 1.5 | 1.6 | 0.4 | — | 0.4 | |

TABLE 7

| Specimen No. | | Sacrificial material composition [wt %] | | | | | | |
|---|---|---|---|---|---|---|---|---|
| | | Zn | Mn | Si | Fe | Cr | Ti | Mg |
| Comparative Example | 1 | 3.0 | — | — | 0.3 | — | — | 0.1 |
| | 2 | 3.0 | — | — | 0.3 | — | — | — |
| | 3 | 3.0 | — | — | 0.3 | — | — | 0.05 |
| | 4 | 3.0 | — | — | 0.3 | — | — | — |
| | 5 | 3.0 | — | — | 0.5 | — | — | — |
| | 6 | 3.0 | — | 0.5 | — | — | — | 0.08 |
| | 7 | 3.0 | — | 0.5 | 0.3 | — | — | — |
| | 8 | 3.0 | — | 0.5 | 0.3 | — | — | — |
| | 9 | 3.0 | 0.8 | — | 0.5 | — | 0.1 | — |
| | 10 | 3.0 | 0.5 | — | — | — | 0.1 | 0.02 |
| | 11 | 3.0 | 0.5 | — | — | 0.1 | — | — |
| | 12 | 3.0 | 0.8 | — | — | 0.2 | — | — |
| | 13 | 3.0 | 0.8 | 0.5 | — | — | — | — |
| | 14 | 0.2 | 0.5 | — | 0.3 | 0.1 | — | — |
| | 15 | 6.0 | 0.5 | — | 0.3 | 0.1 | — | 0.03 |
| | 16 | 3.0 | 1.0 | — | 0.3 | — | — | — |
| | 17 | 3.0 | 0.5 | 0.2 | 0.3 | — | — | — |
| | 18 | 3.0 | — | — | 0.3 | — | — | — |
| | 19 | 3.0 | 0.5 | — | 0.3 | — | — | — |
| | 20 | 3.0 | — | 0.4 | 0.3 | — | — | — |
| | 21 | 3.0 | 0.5 | 0.3 | 0.3 | — | — | — |
| | 22 | 3.0 | — | 0.4 | 0.3 | — | — | — |
| | 23 | 3.0 | — | 0.5 | — | — | — | 0.08 |
| | 24 | — | — | — | — | 0.2 | — | — |
| | 25 | 3.0 | 0.8 | — | 0.5 | — | — | — |
| | 26 | — | — | — | — | 0.2 | — | — |
| Reference Example | 1 | 3.0 | 1.8 | 0.4 | 0.4 | — | — | 0.02 |
| | 2 | 3.0 | — | 0.4 | 1.0 | 0.1 | — | 0.09 |
| | 3 | 3.0 | 0.5 | 0.4 | 0.3 | 0.6 | 0.1 | 0.2 |
| | 4 | 3.0 | — | 0.4 | 0.5 | — | 0.4 | — |
| | 5 | 3.0 | — | 0.4 | 0.5 | — | 0.1 | — |
| | 6 | — | — | — | — | — | — | 0.4 |

TABLE 8

| Specimen No. | | Brazability | | Coarse Si particles | Corrosion resistance | | Strength after brazing [MPa] | Evaluation |
|---|---|---|---|---|---|---|---|---|
| | | Joint ratio | Fillet length | | Surface of sacrificial material Cu [wt %] | Corrosion depth | | |
| Comparative Example | 1 | X | E | A | 0.07 | A | 182 | B |
| | 2 | X | E | A | 0.07 | A | 189 | B |
| | 3 | O | E | A | 0.07 | A | 184 | B |

TABLE 8-continued

|  |  | Brazability | | | Corrosion resistance | | | |
|---|---|---|---|---|---|---|---|---|
|  |  |  |  |  | Surface of | | | |
|  |  | Joint | Fillet | Coarse Si | sacrificial material Cu | Corrosion | Strength after brazing | |
| Specimen No. | | ratio | length | particles | [wt %] | depth | [MPa] | Evaluation |
|  | 4 | X | E | C | 0.07 | A | 188 | B |
|  | 5 | O | E | A | 0.07 | A | 182 | B |
|  | 6 | X | E | A | 0.07 | A | 149 | C |
|  | 7 | X | E | C | 0.07 | A | 165 | C |
|  | 8 | Evaluation material cannot be manufactured and evaluated. | | | | | | |
|  | 9 | Poor brazing due to generation of significant erosion | | | 0.07 | A | 190 | A |
|  | 10 | O | C | A | 0.07 | A | 172 | C |
|  | 11 | Evaluation material cannot be manufactured and evaluated. | | | | | | |
|  | 12 | O | A | A | 0.07 | A | 168 | C |
|  | 13 | Evaluation material cannot be manufactured and evaluated. | | | | | | |
|  | 14 | Evaluation material cannot be manufactured and evaluated. | | | | | | |
|  | 15 | Evaluation material cannot be manufactured and evaluated. | | | | | | |
|  | 16 | O | E | A | 0.07 | A | 186 | B |
|  | 17 | O | E | A | 0.07 | A | 185 | B |
|  | 18 | O | E | A | 0.07 | A | 184 | B |
|  | 19 | O | E | A | 0.07 | A | 186 | B |
|  | 20 | O | E | A | 0.07 | A | 186 | B |
|  | 21 | O | E | A | 0.07 | A | 187 | B |
|  | 22 | O | E | A | 0.07 | A | 188 | B |
|  | 23 | X | E | A | 0.07 | A | 143 | D |
|  | 24 | O | C | A | 0.013 | A | 144 | D |
|  | 25 | O | C | A | 0.07 | A | 135 | D |
|  | 26 | O | C | A | 0.20 | F | 170 | C |
| Reference Example | 1 | Evaluation material cannot be manufactured and evaluated. | | | | | | |
|  | 2 | Evaluation material cannot be manufactured and evaluated. | | | | | | |
|  | 3 | Evaluation material cannot be manufactured and evaluated. | | | | | | |
|  | 4 | Evaluation material cannot be manufactured and evaluated. | | | | | | |
|  | 5 | Evaluation material cannot be manufactured and evaluated. | | | | | | |
|  | 6 | Evaluation material cannot be manufactured and evaluated. | | | | | | |

TABLE 9

|  |  | (Brazing material) | | | | | |
|---|---|---|---|---|---|---|---|
|  |  | Casting | | Hot rolling condition | | | |
|  |  | condition Molten metal temperature (° C.) | Homogenization condition Temperature and time (° C., h) | Rolling time between 400° C. and 500° C. (min) | Equivalent strain ε | Finish temperature (° C.) | Cooling rate (° C./h) |
| Specimen No. | | | | | | | |
| Target range | A | 710 | 450° C., 5 h | 15 | 5.7 | 320 | 25 |
|  | B | 715 | 450° C., 5 h | 14 | 5.4 | 334 | 21 |
|  | C | 715 | 500° C., 2 h | 10 | 5.5 | 355 | 35 |
|  | D | 725 | 550° C., 2 h | 14 | 5.5 | 274 | 28 |
|  | E | 725 | 400° C., 8 h | 18 | 5.9 | 290 | 38 |
|  | F | 735 | 400° C., 8 h | 22 | 5.7 | 252 | 35 |
|  | G | 735 | 450° C., 8 h | 15 | 6.1 | 315 | 42 |
|  | H | 720 | 450° C., 8 h | 24 | 5 | 340 | 34 |
|  | I | 755 | 500° C., 5 h | 14 | 6.4 | 347 | 52 |
|  | J | 745 | 500° C., 5 h | 30 | 5 | 290 | 32 |
| Outside the target | K | 695 | 400° C., 8 h | 15 | 5.3 | 267 | 18 |
|  | L | 680 | 380° C., 8 h | 8 | 5.2 | 220 | 12 |
|  | M | 715 | 380° C., 8 h | 22 | 4.8 | 337 | 36 |
|  | N | 670 | 350° C., 8 h | 15 | 4.6 | 395 | 22 |
|  | O | 705 | 350° C., 8 h | 7 | 5.7 | 322 | 35 |

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An aluminum alloy clad material comprising three layers comprising:
a sacrificial material disposed on one surface of a core material; and
an Al—Si—Mg—Bi brazing material which is disposed on the other surface of the core material, comprising, by mass %, from 6.0% to 14.0% of Si, from 0.05% to 1.5% of Mg, from 0.05% to 0.25% of Bi, from 0.0001% to 0.1% of Sr, and a balance consisting of Al and inevitable impurities, and satisfying a relationship of (Bi+Mg)×Sr≤0.1 in amounts of elements by mass %,
wherein the Al—Si—Mg—Bi brazing material comprises more than 20 in number per 10,000-μm² visual field of Mg—Bi compounds having a diameter of from 0.1 μm to less than 5.0 μm, in terms of equivalent circle diameter and less than 2 in number per 10,000-μm² visual field of the Mg—Bi compounds having a diameter of 5.0 μm or more, when observed in a surface layer plane direction before brazing, and
wherein the core material comprises, by mass %, from 0.9% to 1.7% of Mn, from 0.2% to 1.0% of Si, from 0.1% to 0.5% of Fe, from 0.08% to 1.0% of Cu, and a balance consisting of Al and inevitable impurities.

2. The aluminum alloy clad material according to claim 1, wherein the core material further comprises from 0.1% to 0.7% of Mg and comprises a balance consisting of Al and inevitable impurities.

3. The aluminum alloy clad material according to claim 1, wherein the core material further comprises from 0.05% to 0.3% of Ti and comprises a balance consisting of Al and inevitable impurities.

4. The aluminum alloy clad material according to claim 2, wherein the core material further comprises from 0.05% to 0.3% of Ti and comprises a balance consisting of Al and inevitable impurities.

5. The aluminum alloy clad material according to claim 1, wherein a concentration of Mg on a surface of the brazing material at a braze melting temperature is from 0.15% to 1.0%.

6. The aluminum alloy clad material according to claim 2, wherein a concentration of Mg on a surface of the brazing material at a braze melting temperature is from 0.15% to 1.0%.

7. The aluminum alloy clad material according to claim 3, wherein a concentration of Mg on a surface of the brazing material at a braze melting temperature is from 0.15% to 1.0%.

8. The aluminum alloy clad material according to claim 4, wherein a concentration of Mg on a surface of the brazing material at a braze melting temperature is from 0.15% to 1.0%.

9. The aluminum alloy clad material according to claim 1, wherein the sacrificial material comprises, by mass %, at least one of from 0.2% to 6.0% of Zn, from 0.3% to 1.3% of Mn, from 0.2% to 0.8% of Si from 0.02% to 0.3% of Mg, from 0.2% to 0.8% of Fe, from 0.05% to 0.5% of Cr, and from 0.05% to 0.3% of Ti, and comprises a balance consisting of Al and inevitable impurities, and
a concentration of Cu on a surface of the sacrificial material after brazing is 0.12% or less.

10. The aluminum alloy clad material according to claim 2, wherein the sacrificial material comprises, by mass %, at least one of from 0.2% to 6.0% of Zn, from 0.3% to 1.3% of Mn, from 0.2% to 0.8% of Si, from 0.02% to 0.3% of Mg, from 0.2% to 0.8% of Fe, from 0.05% to 0.5% of Cr, and from 0.05% to 0.3% of Ti, and comprises a balance consisting of Al and inevitable impurities, and
a concentration of Cu on a surface of the sacrificial material after brazing is 0.12% or less.

11. The aluminum alloy clad material according to claim 3, wherein the sacrificial material comprises, by mass %, at least one of from 0.2% to 6.0% of Zn, from 0.3% to 1.3% of Mn, from 0.2% to 0.8% of Si, from 0.02% to 0.3% of Mg, from 0.2% to 0.8% of Fe, from 0.05% to 0.5% of Cr, and from 0.05% to 0.3% of Ti, and comprises a balance consisting of Al and inevitable impurities, and
a concentration of Cu on a surface of the sacrificial material after brazing is 0.12% or less.

12. The aluminum alloy clad material according to claim 4, wherein the sacrificial material comprises, by mass %, at least one of from 0.2% to 6.0% of Zn, from 0.3% to 1.3% of Mn, from 0.2% to 0.8% of Si, from 0.02% to 0.3% of Mg, from 0.2% to 0.8% of Fe, from 0.05% to 0.5% of Cr, and from 0.05% to 0.3% of Ti, and comprises a balance consisting of Al and inevitable impurities, and
a concentration of Cu on a surface of the sacrificial material after brazing is 0.12% or less.

13. The aluminum alloy clad material according to claim 5, wherein the sacrificial material comprises, by mass % at least one of from 0.2% to 6.0% of Zn, from 0.3% to 1.3% of Mn, from 0.2% to 0.8% of Si, from 0.02% to 0.3% of Mg, from 0.2% to 0.8% of Fe, from 0.05% to 0.5% of Cr, and from 0.05% to 0.3% of Ti, and comprises a balance consisting of Al and inevitable impurities, and
a concentration of Cu on a surface of the sacrificial material after brazing is 0.12% or less.

14. The aluminum alloy clad material according to claim 6, wherein the sacrificial material comprises, by mass %, at least one from 0.2% to 6.0% of Zn, from 0.3% to 1.3% of Mn, from 0.2% to 0.8% of Si from 0.02% to 0.3% of Mg, from 0.2% to 0.8% of Fe, from 0.05% to 0.5% of Cr, and from 0.05% to 0.3% of Ti, and comprises a balance consisting of Al and inevitable impurities, and
a concentration of Cu on a surface of the sacrificial material after brazing is 0.12% or less.

15. The aluminum alloy clad material according to claim 7, wherein the sacrificial material comprises, by mass %, at least one of from 0.2% to 6.0% of Zn, from 0.3% to 1.3% of Mn, from 0.2% to 0.8% of Si, from 0.02% to 0.3% of Mg, from 0.2% to 0.8% of Fe, from 0.05% to 0.5% of Cr and from 0.05% to 0.3% of Ti, and comprises a balance consisting of Al and inevitable impurities, and
a concentration of Cu on a surface of the sacrificial material after brazing is 0.12% or less.

16. The aluminum alloy clad material according to claim 8, wherein the sacrificial material comprises, by mass %, at least one of from 0.2% to 6.0% of Zn, from 0.3% to 1.3% of Mn, from 0.2% to 0.8% of Si, from 0.02% to 0.3% of Mg, from 0.2% to 0.8% of Fe, from 0.05% to 0.5% of Cr, and from 0.05% to 0.3% of Ti, and comprises a balance consisting of Al and inevitable impurities, and
a concentration of Cu on a surface of the sacrificial material after brazing is 0.12% or less.

17. The aluminum alloy clad material according to claim 1, wherein the Al—Si—Mg—Bi brazing material comprises, by mass %, from 0.1% to 1.5% of Mg.

18. The aluminum alloy clad material according to claim 1, wherein the Al—Si—Mg—Bi brazing material comprises, by mass %, from 0.2% to 1.5% of Mg.

* * * * *